United States Patent
Mittal et al.

(10) Patent No.: US 8,918,714 B2
(45) Date of Patent: Dec. 23, 2014

(54) PRINTING A DOCUMENT CONTAINING A VIDEO OR ANIMATIONS

(75) Inventors: Romil Mittal, Noida (IN); Narinder Beri, Jalandhar (IN); Ashu Mittal, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1715 days.

(21) Appl. No.: 11/734,269

(22) Filed: Apr. 11, 2007

(65) Prior Publication Data
US 2014/0268184 A1   Sep. 18, 2014

(51) Int. Cl.
*G06F 17/00* (2006.01)
*G06F 3/12* (2006.01)
*G06F 17/21* (2006.01)

(52) U.S. Cl.
CPC ............ *G06F 3/1253* (2013.01); *G06F 3/1206* (2013.01); *G06F 17/211* (2013.01)
USPC ............................. 715/273; 715/200; 715/204

(58) Field of Classification Search
CPC ...................................................... G06F 17/211
USPC ........................ 715/200, 201, 204, 209, 273
See application file for complete search history.

(56) References Cited

U.S. PATENT DOCUMENTS

| | | | |
|---|---|---|---|
| 5,404,316 A * | 4/1995 | Klingler et al. | 715/723 |
| 5,682,326 A * | 10/1997 | Klingler et al. | 715/202 |
| 6,535,639 B1 * | 3/2003 | Uchihachi et al. | 382/225 |
| 6,901,110 B1 * | 5/2005 | Tsougarakis et al. | 375/240.12 |
| 7,149,974 B2 * | 12/2006 | Girgensohn et al. | 715/723 |
| 7,180,757 B2 * | 2/2007 | Chen et al. | 363/49 |
| 2001/0020981 A1 * | 9/2001 | Jun et al. | 348/426.1 |
| 2002/0075572 A1 * | 6/2002 | Boreczky et al. | 359/722 |
| 2002/0126203 A1 * | 9/2002 | Yu et al. | 348/61 |
| 2002/0175932 A1 * | 11/2002 | Yu et al. | 345/720 |
| 2003/0033331 A1 * | 2/2003 | Sena et al. | 707/513 |
| 2003/0090504 A1 * | 5/2003 | Brook et al. | 345/716 |
| 2003/0189588 A1 * | 10/2003 | Girgensohn et al. | 345/723 |
| 2004/0098671 A1 * | 5/2004 | Graham et al. | 715/527 |
| 2004/0181747 A1 * | 9/2004 | Hull et al. | 715/500.1 |
| 2005/0216852 A1 | 9/2005 | Hull | |
| 2005/0229107 A1 | 10/2005 | Hull | |
| 2008/0088706 A1 * | 4/2008 | Girgensohn et al. | 348/207.99 |
| 2008/0235574 A1 * | 9/2008 | Telek et al. | 715/240 |

* cited by examiner

*Primary Examiner* — Thu Huynh
(74) *Attorney, Agent, or Firm* — Kilpatrick Townsend & Stockton LLP

(57) ABSTRACT

A system and method for printing a multimedia document including a multimedia content in the form of video, animation or graphics. While printing a multimedia document including a video file, instead of printing the default poster view, a set of frames extracted from the video file is printed. In one embodiment of the invention, the frames are extracted from the video file using a frame extraction algorithm and temporary layout of the set of frames is created for printing. User can configure to print the set of frames in the same area of the video file in the multimedia document, or can configure to print them in a separate page.

18 Claims, 6 Drawing Sheets

100
FIG: 1 (Prior Art)

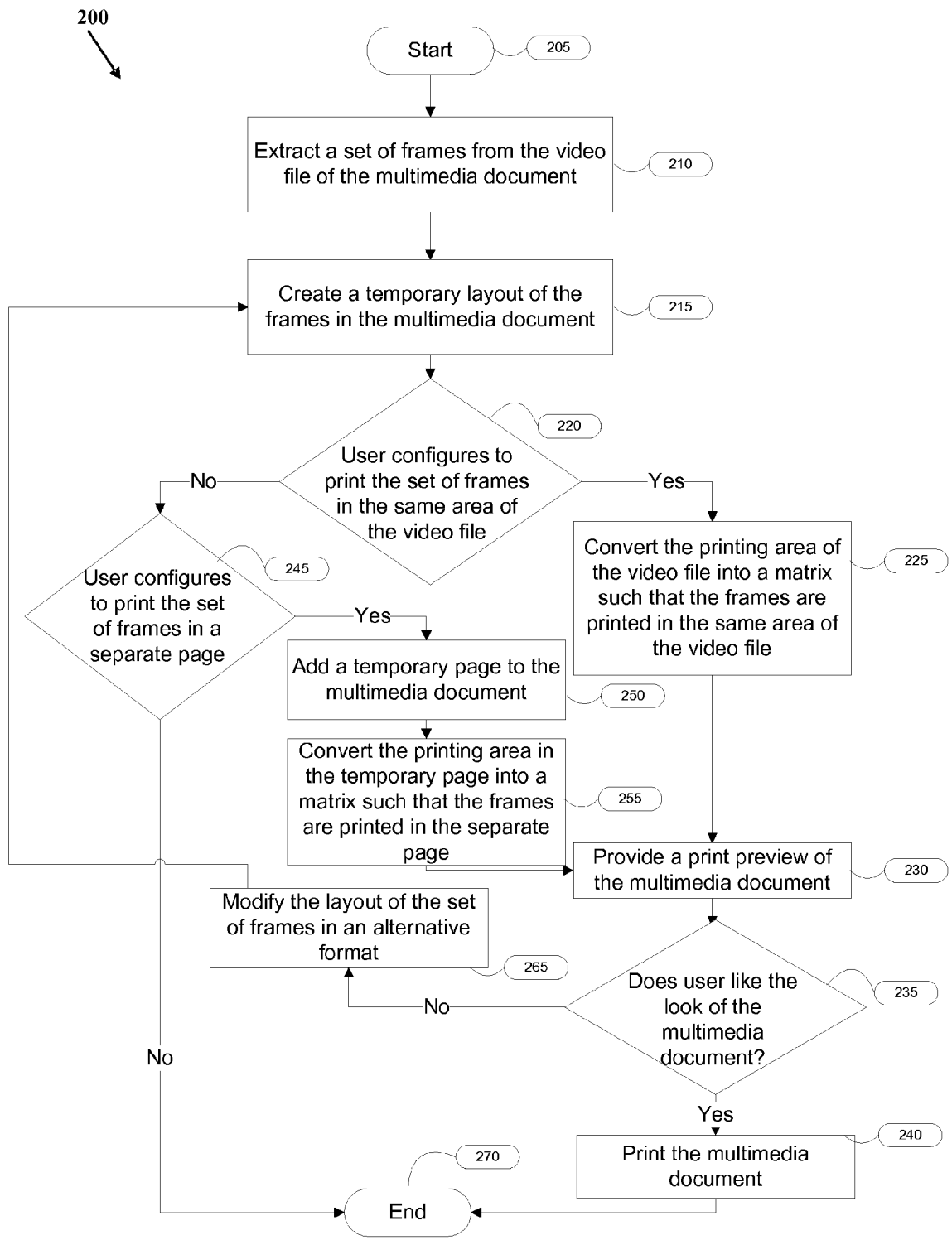
FIG: 2

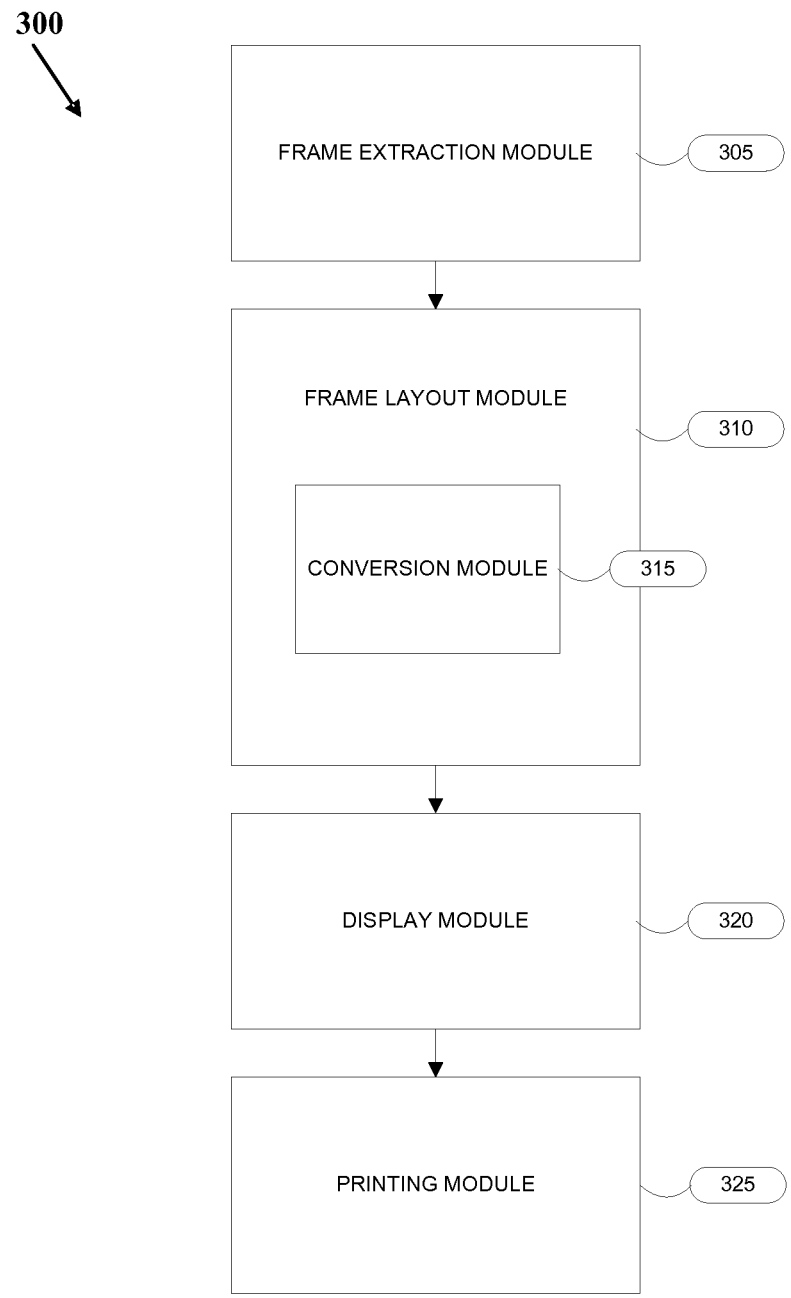
FIG: 3

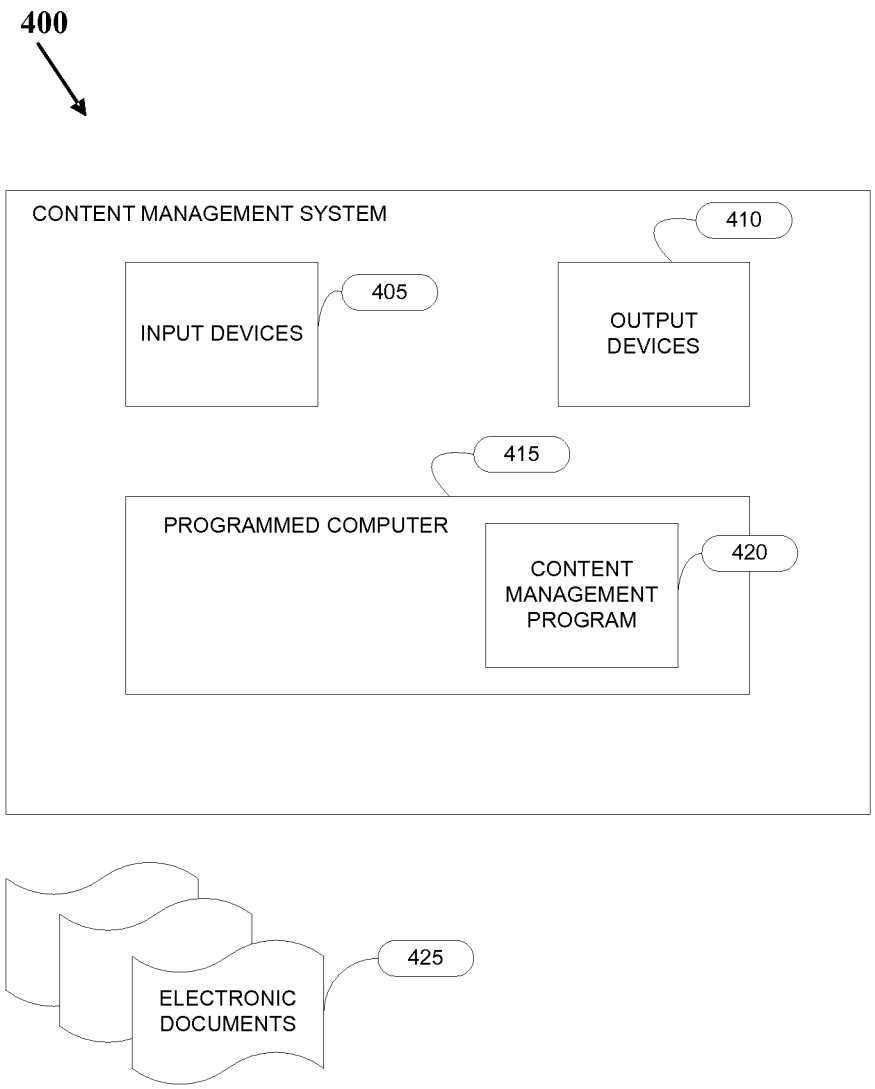
FIG: 4

500
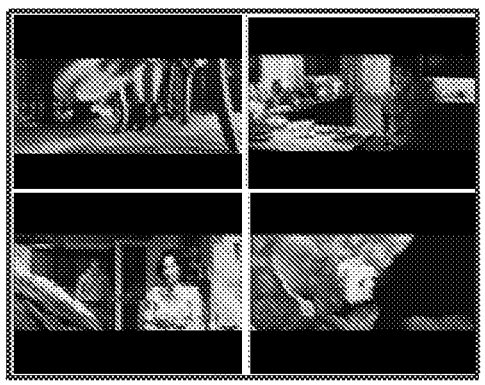
FIG: 5

FIG: 6

PRINTING A DOCUMENT CONTAINING A VIDEO OR ANIMATIONS

BACKGROUND

1. Technical Field

Embodiments of the invention relate generally to document printing and more specifically to printing a multimedia document.

2. Prior Art

Multimedia documents are documents that contain multimedia content e.g. a combination of textual, audio and/or video content, images and animated graphics. Such documents are becoming increasingly popular due to several reasons. First, multimedia documents are more expressive as compared to documents containing mere text and/or pictures. Second, increased storage capacity on computers and bandwidth for transmission of information both on the Internet and mobile telephony networks allows for ease of creation and use of multimedia documents thus contributing to their growing popularity.

However, problems arise when a user desires to print a multimedia document. Typically, while printing a multimedia document, only a default poster view representing the video file, or an icon representing the video file is printed on paper as illustrated in FIG. 1, 100. However, this default poster view may not meaningfully represent the multimedia content of the document.

In some other methods, the first frame of the video file is extracted and printed on paper in the area of the video file. However, when the first frame is blank, it does not meaningfully represent the multimedia content of the document.

SUMMARY

Embodiments of the invention described herein provide a computer implemented system and method for printing a multimedia document including multimedia content such as a video file or animation file.

Embodiments of the invention relate to extracting a set of frames from a video file of a multimedia document, and creating a temporary layout of the set of frames in the multimedia document for printing. In one embodiment of the invention, the printing area of the video file is converted into a matrix. A print preview of the multimedia document is displayed to the user. The number of frames which are extracted can be configured by the user. The set of frames are extracted at equally spaced time intervals, or according to user specified time intervals. The method prints the set of frames in the same area of the video file or in a separate page according to user input.

An example system provides creating a layout of a set of frames extracted from multimedia documents including video files. The system includes an extraction module for extracting a set of frames from a video file of a multimedia document, and a frame layout module for creating a temporary layout of the set of frames in the multimedia document for printing. The conversion module converts a printing area of the video file into a matrix in response to a user input which configures to print the set of frames in a same area of the video file in the multimedia document. The conversion module adds a temporary page to the multimedia document in response to a user input which configures to print the set of frame in a separate page, and converts the print area in the temporary page into a matrix. The display module displays a preview of the temporary layout of the set of frames in the multimedia document.

An example computer program product, encoded on a computer-readable medium, operable to cause data processing apparatus to perform operations to provide creating a layout of a set of frames extracted from multimedia documents including video files. The computer program extracts a set of frames from a video file of a multimedia document; and creates a temporary layout of the set of frames in the multimedia document for printing. The computer program converts the printing area of the video file into a matrix. The number of frames to be extracted is configurable by the user. The set of frames is extracted either at equally spaced time intervals, or according to user specified time intervals. A print preview of the multimedia document is displayed to the user. The computer program prints the set of frames in the same area of the video file or in a separate page according to user input.

Other aspects and example embodiments are provided in the Figures and the Detailed Description that follow.

BRIEF DESCRIPTION OF THE DRAWINGS

FIG. 1 is a view of the default poster of the video file according to prior art;

FIG. 2 is a flow chart illustrating the sequence of steps in the method for printing a video file in a multimedia document according to an embodiment of the invention;

FIG. 3 is a block diagram view of an embodiment of the invention;

FIG. 4 illustrates an embodiment of a content management system;

FIG. 5 illustrates an embodiment of the print view of the video file including four frames; and FIG. 6 illustrates an embodiment of the print view of the video file including sixteen frames.

DETAILED DESCRIPTION OF EMBODIMENTS

FIG. 1 is a view of the default poster of the video file according to prior art 100.

FIG. 2 is a flow chart illustrating steps of an embodiment of the invention in the method 200 for printing a video file in a multimedia document according to an embodiment of the invention. It will be appreciated that video files are only examples, and embodiments of the invention could be used with other multimedia content. The method starts in step 205 when the user opts to view a multimedia document including a video or animation file. Step 210 extracts the set of frames in the video file of the multimedia document. User can specify the number of frames to be printed on the video area of the multimedia document. If the user configures to print 'n' number of frames in the video area on the paper, the size of the frame printed will be reduced to 1/n th of the original size of the video area. Frame extraction from the video file can be performed at equally spaced time intervals to get the specified 'n' number of frames, or at certain time intervals as specified by the user.

In an embodiment of the invention, using existing frame extraction algorithms the set of frames from the video file can be extracted. It will be appreciated that the particular exemplary embodiment of the invention as follows is provided by way of illustration, and not limitation. Those knowledgeable in the art will recognize that other extraction algorithms may be used for extracting the set of frames from the video file without deviating from the spirit of the invention.

In an embodiment of the invention, an example algorithm calculates the total number of frames in a particular video file according to the specified number of frames to be printed on the video area of the multimedia document, computes the incremental step at which a frame needs to be extracted, and extracts the set of frames. The incremental step is calculated by dividing the total number of frames in the video file by the required number of frames. For example, if the specified number of frames to be printed on the paper is 4, and the video file has 1000 total number of frames, the extraction algorithm computes the incremental step by dividing 1000 by 4 and calculates the incremental step for extraction as 250. Then, the algorithm extracts every $250^{th}$ frame in the video file starting from the first frame till 4 frames are extracted. This example algorithm is given as follows:

mpegInInfo *inInfo;
int mem_size;
inInfo=mpegInNew(get_rc, NULL);
mpegInOpen(in Info, "test.mpg");
// This value is configurable and would depend on the size of the requested download int numRequiredFrames=4;
// Get the total number of frames in the video
int totalFrames=inInfo->totalFrames;
// Compute the incremental step at which a frame needs to be extracted
int step=totalFrames/numRequiredFrames;
// Extract the frames
for(int i=0; i<numFrames; i+=step)
{
mpegInSeekFrame(inInfo, i);
}
mpegInClose(inInfo);
mpegInFree(inInfo);

After extracting the frames, step 215 creates a temporary layout of the frames in the multimedia document for printing. If the user configures to print the set of frames in the same area of the video file as in the multimedia document in step 220, step 225 converts the printing area of the video file into a matrix such that the frames are printed in the same area of the video file as in the multimedia document. If the user configures to print the set of frames in a separate page in step 245, step 250 adds a temporary page to the multimedia document followed by converting the print area in the temporary page into a matrix in step 255. After either of steps 225 or 250 and 255, step 230 provides a print preview, as the case may be, of the layout of number of frames in the multimedia document or layout of frames in a separate page of the multimedia document, as they would appear printed on paper.

In step 235, if the user likes the look of the modified document, he or she may choose step 240 to print the modified document. If the user does not like the look, step 265 again modifies the layout of frames in an alternative format by repeating the steps 215-255, whichever is necessary, and gives options to the user to configure the number of frames to be printed on the paper if the user declines to print. A preview of the frame layout is again displayed to the user using step 230. The method ends in step 270 after selecting and printing the appropriate layout of the frames. Since the user is provided with more frames of the video/animation, he/she would be able to get a better overview of the multimedia content. Also, if there is any other content (text or any other format) in the document which is related to the video, user will be able to comprehend it better using more number of frames.

It will be appreciated that the method of printing the multimedia document including a video file could be done as a preprocessing step, wherein once a frame layout is generated it is stored along with the file. Alternatively the method could be performed spontaneously whenever a multimedia document is presented for viewing such as in a file explorer window. In another embodiment, the method of generating a frame layout is performed whenever a document including a video or animation is presented for display, such as in a web browser. For example if a web page is loaded that includes a video clip within the content of the web page, rather than displaying the first frame or designated poster frame of the video, at least a portion of the method of generating a frame layout is performed to generate a layout of a predetermined number of frames of the video clip, which is then displayed in place of the standard first frame or designated poster frame of the video clip when displaying the web page.

FIG. 3 illustrates a block diagram according to an embodiment of the invention 300. Frame extraction module 305 performs FIG. 2 step 215 of extracting the set of frames in the video file of the multimedia document. Frame layout module 310 performs step 220 of creating a temporary layout of the frames in the multimedia document for printing. Conversion module 315 performs step 225 of converting the printing area of the multimedia document into a matrix if the user configures to print the set of frames in the same area of the video file as in the multimedia document, and also performs step 255 of converting the print area in the temporary page into a matrix if the user configures to print the set of frames in a separate page. Display module 320 performs step 230 of providing a print preview, as the case may be, the layout of number of frames in the multimedia document, layout of frames in a separate page of the multimedia document, as they would appear printed on the paper. Print module 325 performs step 260 of printing the multimedia document with the extracted video frames.

The method of one embodiment of the invention is preferably performed by a content management program 420 running on a computer 415 in a content management system 400 as shown in FIG. 4. The system typically also has input devices 405 and output devices 410. Content management program 420 enables creating, manipulating, managing, storing, displaying and printing electronic documents 425. Such electronic documents 425 include multimedia documents and are typically characterized by content information, such as text, video files, graphics, animations and the like, and can include for example web pages, PDF documents, electronic books or documents (including files) in other conventional formats. Users can use content management program 420 to preview the layout of frames before printing. The content management program 420 can be implemented as part of a web browser or a conventional content management program such as Adobe® Acrobat® or Adobe® InDesign®. An embodiment of the invention can be implemented and performs the method steps in digital electronic circuitry, or in computer hardware, firmware, software, in a machine-readable storage device, or in combinations of them.

FIG. 5, 500 and FIG. 6, 600 illustrate the print view of the video file including the set of frames of the video file according to embodiments of the invention. FIG. 5 illustrates an embodiment of the print view of the video file illustrated in FIG. 1, in which the user has specified 4 frames of the video are to be displayed. For example, the image shown in FIG. 1 represents what would appear on a printed page using conventional methods for printing a multimedia document including the video file, i.e. just the poster frame of the video file is rendered to the printed page. In one embodiment of the invention, in which the user specifies that 4 frames are to be displayed, FIG. 5 represents what would appear on a printed page in the region of the video file. In one embodiment, the four frames represent the first frame, a frame at approximately 1/3rd of the duration of the video, a frame at approximately 2/3rd of the duration of the video, and the last frame of the video, respectively.

In one embodiment of the invention, in which the user specifies that 16 frames are to be displayed, FIG. 6, 600 illustrates what would appear on a printed page in the region of the video file.

The forgoing description sets forth numerous specific details to convey a thorough understanding of the invention. However, it will be apparent to one skilled in the art that the embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

We claim:

1. A computer-implemented method, comprising:
performing, by a computer:
receiving configuration information indicating a number of frames to display;
based on the number of frames, selecting a plurality of video or animation frames from visual content of a multimedia document;
extracting the plurality of video or animation frames from the visual content of the multimedia document, wherein a visible default icon or visible default single frame of the visual content of the multimedia document is designated to be displayed in a video area of the multimedia document during a display of the multimedia document to represent the visual content of the multimedia document, wherein the video area is a location containing a video clip or animation within the multimedia document;
creating a matrix to display the plurality of video or animation frames based on the number of frames, wherein the matrix comprises a plurality of rows and a plurality of columns that form a number of cells;
calculating a reduced representation size for each of the extracted plurality of video or animation frames based on the number of frames, wherein each of the extracted plurality of video or animation frames is displayed within a respective cell of the cells of the matrix at the reduced representation size; and
presenting the multimedia document, wherein said presenting represents the visual content of the multimedia document by displaying the matrix, wherein the matrix is displayed in place of the designated visible default icon or designated visible default single frame, and wherein the matrix is displayed in the location within the multimedia document in which the visible default icon or visible default single frame is designated to be displayed.

2. The method of claim 1, wherein:
said presenting comprises converting a printing area of the multimedia document into the matrix; and
said presenting comprises printing the matrix comprising the plurality of extracted video or animation frames, wherein said printing positions the matrix within the multimedia document in the same video area location within of the multimedia document in which the visible default icon or visible default poster view single frame is designated to be displayed.

3. The method of claim 1, wherein said extracting is based on an input which specifies the number of video or animation frames to be extracted from the visual content of the multimedia document.

4. The method of claim 1, wherein said extracting extracts the plurality of video or animation frames at equally spaced time intervals.

5. The method of claim 1, wherein said extracting extracts the plurality of video or animation frames at time intervals specified by user input.

6. The method of claim 1, further comprising, during preprocessing:
generating a temporary layout of the matrix; and
storing the temporary layout along with the visual content.

7. The method of claim 1, wherein the visible default poster view single frame of the visual content of the multimedia document is designated to be displayed in the video area of the multimedia document, and the designated visible default poster view single frame is a poster frame or a first frame of the visual content of the multimedia document.

8. The method of claim 1, wherein said extracting is performed in response to input to present the multimedia document.

9. The method of in claim 1, wherein n frames are specified for said matrix, and wherein each of the plurality of extracted video or animation frames is displayed within said video area at 1/n an original size of said video area.

10. A system, comprising:
a processor; and
a device coupled to the processor, wherein the device stores program instructions for:
receiving configuration information indicating a number of frames to display;
based on the number of frames, selecting a plurality of video or animation frames from visual content of a multimedia document;
extracting the plurality of video or animation frames from the visual content of the multimedia document, wherein a visible default icon or visible default single frame of the visual content of the multimedia document is designated to be displayed in a video area of the multimedia document during a display of the multimedia document to represent the visual content of the multimedia document, wherein the video area is a location containing a video clip or animation within the multimedia document;
creating a matrix to display the plurality of video or animation frames based on the number of frames, wherein the matrix comprises a plurality of rows and a plurality of columns that form a number of cells;
calculating a reduced representation size for each of the extracted plurality of video or animation frames based on the number of frames, wherein each of the extracted plurality of video or animation frames is displayed within a respective cell of the cells of the matrix at the reduced representation size; and
presenting the multimedia document, wherein said presenting represents the visual content of the multimedia document by displaying the matrix, wherein the matrix is displayed in place of the designated visible default icon or designated visible default single frame, wherein displaying the matrix is not related to video playback, wherein the matrix is displayed in an area equal to the video area of the visible default icon or visible default single frame, and wherein the matrix is displayed in the location within the multimedia document in which the visible default icon or visible default single frame is designated to be displayed.

11. The system of claim 10, wherein:
said presenting comprises converting a printing area of the multimedia document into the matrix; and said presenting comprises printing the matrix comprising the plurality of extracted video or animation frames, wherein said printing positions the matrix within the multimedia document in the same video area location within of the multimedia document in which the visible default icon or visible default poster view single frame is designated to be displayed.

12. The system of claim 10, wherein said extracting is based on an input which specifies the number of video or animation frames to be extracted from the visual content of the multimedia document.

13. The system of claim 10, wherein said extracting extracts the plurality of video or animation frames at equally spaced time intervals.

14. The system of claim 10, wherein said extracting extracts the plurality of video or animation frames at time intervals specified by user input.

15. The system of in claim 10, wherein n frames are specified for said matrix, and wherein each of the plurality of extracted video or animation frames is displayed within said video area at 1/n an original size of said video area.

16. A computer program product stored on a non-transitory machine-readable medium, comprising instructions operable to cause a programmable processor to perform:
   receiving configuration information indicating a number of frames to display;
   based on the number of frames, determining a plurality of video or animation frames from visual content of a multimedia document;
   extracting the plurality of video or animation frames from the visual content of the multimedia document, wherein a visible default icon or visible default single frame of the visual content of the multimedia document is designated to be displayed in a video area of the multimedia document during a display of the multimedia document to represent the visual content of the multimedia document, wherein the video area is a location containing a video clip or animation within the multimedia document;
   creating a matrix to display the plurality of video or animation frames based on the number of frames, wherein the matrix comprises a plurality of rows and a plurality of columns that form a number of cells, and wherein the plurality of video or animation frames are not overlaid;
   calculating a reduced representation size for each of the extracted plurality of video or animation frames based on the number of frames, wherein each of the extracted plurality of video or animation frames is displayed within a respective cell of the cells of the matrix at the reduced representation size; and
   presenting the multimedia document, wherein said presenting represents the visual content of the multimedia document by displaying the matrix, wherein the matrix is displayed in place of the designated visible default icon or designated visible default single frame, and wherein the matrix is displayed in the location within the multimedia document in which the visible default icon or visible default single frame is designated to be displayed.

17. The product of claim 16, wherein:
   said presenting comprises converting a printing area of the multimedia document into the matrix; and
   said presenting comprises printing the matrix comprising the plurality of extracted video or animation frames, wherein said printing positions the matrix within the multimedia document in the same video area location within of the multimedia document in which the visible default icon or visible default poster view single frame is designated to be displayed.

18. The product of claim 16, wherein n frames are specified for said matrix, and wherein each of the plurality of extracted video or animation frames is displayed within said video area at 1/n an original size of said video area.

* * * * *